(12) United States Patent
Hiratsuka et al.

(10) Patent No.: US 7,002,816 B2
(45) Date of Patent: Feb. 21, 2006

(54) POWER SUPPLY APPARATUS AND IMAGE FORMING APPARATUS USING THE SAME

(75) Inventors: Masashi Hiratsuka, Kanagawa (JP); Kunihiro Takahashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 133 days.

(21) Appl. No.: 10/625,688

(22) Filed: Jul. 24, 2003

(65) Prior Publication Data

US 2004/0141346 A1 Jul. 22, 2004

(30) Foreign Application Priority Data

Dec. 9, 2002 (JP) .............................. 2002-357354

(51) Int. Cl.
*H02M 7/537* (2006.01)
(52) U.S. Cl. ......................... 363/40; 363/124
(58) Field of Classification Search ................. 363/39, 363/40, 59, 71, 24, 131, 124
See application file for complete search history.

(56) References Cited

U.S. PATENT DOCUMENTS

| 4,355,243 | A | * | 10/1982 | Tellert | ........................ 327/129 |
| 4,679,129 | A | * | 7/1987 | Sakakibara et al. | ........... 363/17 |
| 5,151,852 | A | * | 9/1992 | Jacobson et al. | ........... 363/131 |
| 5,159,541 | A | * | 10/1992 | Jain | ............................ 363/26 |
| 5,586,017 | A | * | 12/1996 | Rohrbeck et al. | ............. 363/39 |
| 5,875,103 | A | * | 2/1999 | Bhagwat et al. | ............... 363/17 |
| 5,946,206 | A | * | 8/1999 | Shimizu et al. | ............... 363/65 |

FOREIGN PATENT DOCUMENTS

| JP | 6-197542 | 7/1994 |
| JP | 7-107737 | 4/1995 |

* cited by examiner

*Primary Examiner*—Jeffrey Sterrett
(74) *Attorney, Agent, or Firm*—Oliff & Berridge, PLC

(57) ABSTRACT

A power supply apparatus includes first and second switching elements respectively controlled by first and second clock signals, a first parallel resonance circuit connected between the first switching element and a dc power supply, a second parallel resonance circuit connected between the second switching element and the dc power supply, and a series resonance circuit connected between the first and second parallel resonance circuits. An output voltage of the power supply circuit is obtained from a node in the series resonance circuit.

15 Claims, 12 Drawing Sheets

POWER SUPPLY APPARATUS AND IMAGE FORMING APPARATUS USING THE SAME

BACKGROUND OF THE INVENTION

1. Field of the Invention

The present invention relates to a power supply apparatus for driving a capacitive load, and more particularly, to a power supply apparatus capable of generating a high voltage without transformers. This power supply apparatus can be suitably used to supply high voltages to components of the image forming apparatus, such as those for a developing unit that develops a toner image on a photoconductor member and for a charger that charges the photoconductor member, and a bias voltage for a cleaner.

2. Description of the Related Art

Conventionally, the following is known as an electrophotographic image forming apparatus to which the power supply apparatus of the above-mentioned type is applied (hereinafter referred to as first conventional art for convenience' sake). The surface of a photoconductor drum is evenly charged at a given voltage by a primary charger. Then, an image is formed on the surface of the photoconductor drum by exposure, so that an electrostatic latent image corresponding to the exposed image can be formed thereon. The electrostatic latent image formed on the photoconductor drum is developed by a developing unit, this resulting in a toner image. The toner image formed on the photoconductor drum is transferred onto a transfer sheet by charging of an image transfer charger. The transfer sheet on which the toner image has been formed is separated from the photoconductor drum by charging of a separator charger. Then, the image forming process ends with the step of fixing the toner image on the transfer sheet by a fixing or fusing unit.

For example, a color image forming apparatus equipped with four developing units used to sequentially form toner images of four colors on the photoconductor drum while the drum makes four turns is required to develop the toner image of color of interest without disturbing the previously developed toner image(s) of color(s). From this viewpoint, a high-voltage power supply apparatus is used which supplies, during development, one of the four developing units with a DC development bias voltage with an AC voltage necessary for enabling excellent development being superimposed thereon, while supplying the three remaining developing units with a DC voltage that prevents toner from being deposited on the photoconductor drum.

This type of high-voltage power supply apparatus is disclosed in, for example, Japanese Laid-Open Patent Application Publication No. 6-197542, and is now illustrated in FIG. 9. Referring to FIG. 9, the high-voltage power supply apparatus is a high-voltage ac power unit for the developing unit. A dc voltage Vi applied to the primary winding N1 of a stepup transformer T is turned ON/OFF, this resulting in an induced ac voltage across the secondary winding N2. The ac voltage may be applied, as a bias voltage, to the developing unit that functions as a capacitive load. However, the use of the transformer T of the high-voltage ac power unit 10 has a limited usable frequency on the high-frequency side and is unsuitable for high-speed operation. In addition, the use of the transformer T makes it difficult to realize downsizing and weight saving.

The following is known. An alternating signal that serves as a switching pulse of 20 kHz is applied to the primary winding of the transformer T, and an induced dc voltage developing across the secondary winding is subjected to a voltage doubler rectifier. The rectified high voltage may be varied by PWM (Pulse Width Modulation). However, the above-mentioned dc power supply employs the transformer and the same problems as those mentioned before.

The above-mentioned Japanese Laid-Open Patent Application Publication No. 6-197542 also discloses another power supply, which can generate a high voltage utilizing resonance-based switching. FIG. 10 shows this type of power supply, which is called ac bias power supply apparatus. Referring to FIG. 10, an ac bias power supply apparatus 20 includes an inductor L1, a first bias circuit and a second bias circuit. The inductor L1 is connected to a capacitive load in series and forms an LC series resonance circuit together with the capacitive load. The first bias circuit includes a switching circuit SW1 and a diode D1. The second bias circuit includes a switching circuit SW2 and a diode D2. The output voltage can be controlled by adjusting the biasing times of the first and second bias circuits. The switching circuit SW1 forwardly biases the LC series resonance circuit and has a capability of controlling the biasing time. The diode D1 recovers series-resonance energy remaining after biasing by the switching circuit SW1. The switching circuit SW2 backwardly biases the LC series resonance circuit and has a capability of controlling the biasing time. The diode D2 recovers series-resonance energy remaining after biasing by the switching circuit SW2. With the above-mentioned circuit configuration, the power consumed in the capacitive load does not depend on the capacitance thereof, so that power can be supplied to the load efficiently.

There is another resonance-based power supply circuit, which is disclosed in Japanese Laid-Open Patent Application Publication No. 7-107737. This is illustrated in FIG. 11. A resonance-based power supply circuit 30 shown in FIG. 11 has a resonance circuit made up of an inductor L1 and a capacitor C4. A transistor Q3 for oscillation is connected to the resonance circuit, to which voltage doubler rectifier circuits 31 and 32 are connected. The rectifier circuit 31 includes capacitors C11 and C12 and diodes D11 and D12. Similarly, the rectifier circuit 32 includes capacitors C21 and C22 and diodes D21 and D22. By turning on/off the transistor Q3 for making oscillation, a resonance voltage VL1 is generated by the resonance circuit, and is doubled by the voltage doubler rectifier circuits 31 and 32. A triac Q11 for use in output switching is connected to the anode of the diode D11 of the voltage doubler rectifier circuit 31. Similarly, a silicon-controlled rectifier (thyristor) Q21 for use in output switching is connected to the cathode of the diode D21. By turning on/off the switching means of Q11 and Q21, the output voltage is selectively generated at output terminals OUT1 and OUT2.

The high-voltage power supply circuit 30 does not employ any transformer and instead uses the parallel resonance circuit between the power supply and the transistor Q3 serving as the switching element. Thus, the voltage waveform that swings over the positive and negative sides can be output via the voltage doubler rectifier circuits 31 and 32, so that positive and negative dc voltages can be generated.

However, the circuit configuration shown in FIG. 10 has the following disadvantages. The LC series resonance circuit of the ac bias power supply apparatus 20 that utilizes resonance is used to increase the impedance of the load and reduces the loss. Thus, unless the input voltage is increased or the stepup ratio of the transformer is increased, a sine wave having an amplitude that is large as compared to the load cannot be obtained. Further, the use of a transformer having a large stepup ratio may degrade the efficiency of the power supply apparatus.

The power supply circuit 30 shown in FIG. 11 does not have any transformer. However, the transistor Q3 is required to have a high breakdown voltage and operate at high speed in order to obtain a high-voltage, high-frequency ac output. In practice, it is therefore difficult to generate a high-frequency ac output. As is described in Japanese Laid-Open Patent Application Publication No. 7-107737, a flyback voltage may contribute to generating a high voltage having a sufficient pulse width. However, this needs a high input voltage in order to obtain a sine wave having a large amplitude.

SUMMARY OF THE INVENTION

The present invention has been made in view of the above circumstances and provides a surface emitting semiconductor laser and a method of fabricating the same.

More specifically, the present invention provides a power supply apparatus comprising: first and second parallel resonance circuits; a first switching element that is connected to the first parallel resonance circuit and forms a first parallel resonance circuit part together with the first parallel resonance circuit; a second switch element that is connected to the second parallel resonance circuit and forms a second parallel resonance circuit part together with the second parallel resonance circuit; and a series resonance circuit having a first end connected to an end of the first parallel resonance circuit part and a second end connected to an end of the second parallel resonance circuit part, the first and second switching elements being alternately turned on and off in accordance with control signals externally supplied.

According to another aspect of the present invention, there is provided a power supply circuit comprising: first and second switching elements respectively controlled by first and second clock signals; a first parallel resonance circuit connected between the first switching element and a dc power supply; a second parallel resonance circuit connected between the second switching element and the dc power supply; and a series resonance circuit connected between the first and second parallel resonance circuits, an output voltage of the power supply circuit being obtained from a node in the series resonance circuit.

According to yet another aspect of the present invention, there is provided an image forming apparatus comprising: an image forming part; and a power supply apparatus that supplies power to the image forming part, the power supply apparatus comprising: first and second parallel resonance circuits; a first switching element that is connected to the first parallel resonance circuit and forms a first parallel resonance circuit part together with the first parallel resonance circuit; a second switch element that is connected to the second parallel resonance circuit and forms a second parallel resonance circuit part together with the second parallel resonance circuit; and a series resonance circuit having a first end connected to an end of the first parallel resonance circuit part and a second end connected to an end of the second parallel resonance circuit part, the first and second switching elements being alternately turned on and off in accordance with control signals externally supplied.

BRIEF DESCRIPTION OF THE DRAWINGS

Preferred embodiments of the present invention will be described in detail based on the following figures, wherein.

DESCRIPTION OF THE PREFERRED EMBODIMENTS

A description will now be given of embodiments of the present invention with reference to the accompanying drawings.

First Embodiment

Figure 1:
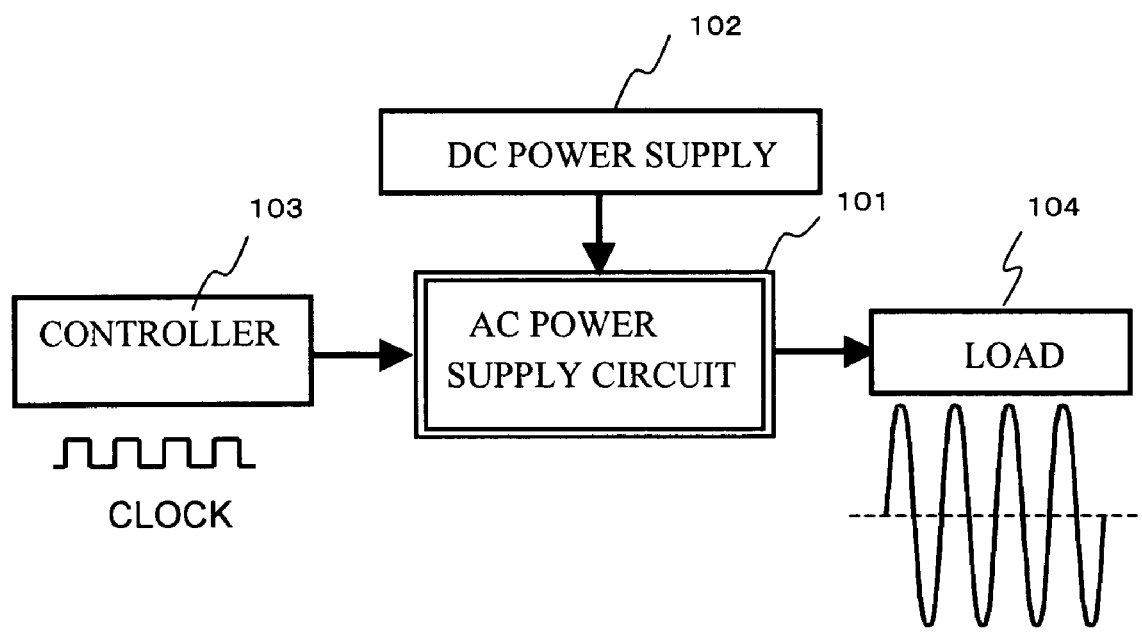
FIG. 1 is a block diagram of a power supply apparatus according to a first embodiment of the present invention.

FIG. 1 is a block diagram of an ac power supply apparatus according to a first embodiment of the present invention. The apparatus includes an ac power supply circuit or apparatus 101, a dc power supply 102, and a controller 101. The ac power supply circuit 101 alternately turns on and off two switching elements that will be described later on the basis of a logic-level clock signal supplied from the controller 103, and supplies a load 104 with a large amplitude sine wave having a frequency dependent on the clock signal. The clock signal serves as a control signal.

Figure 2:
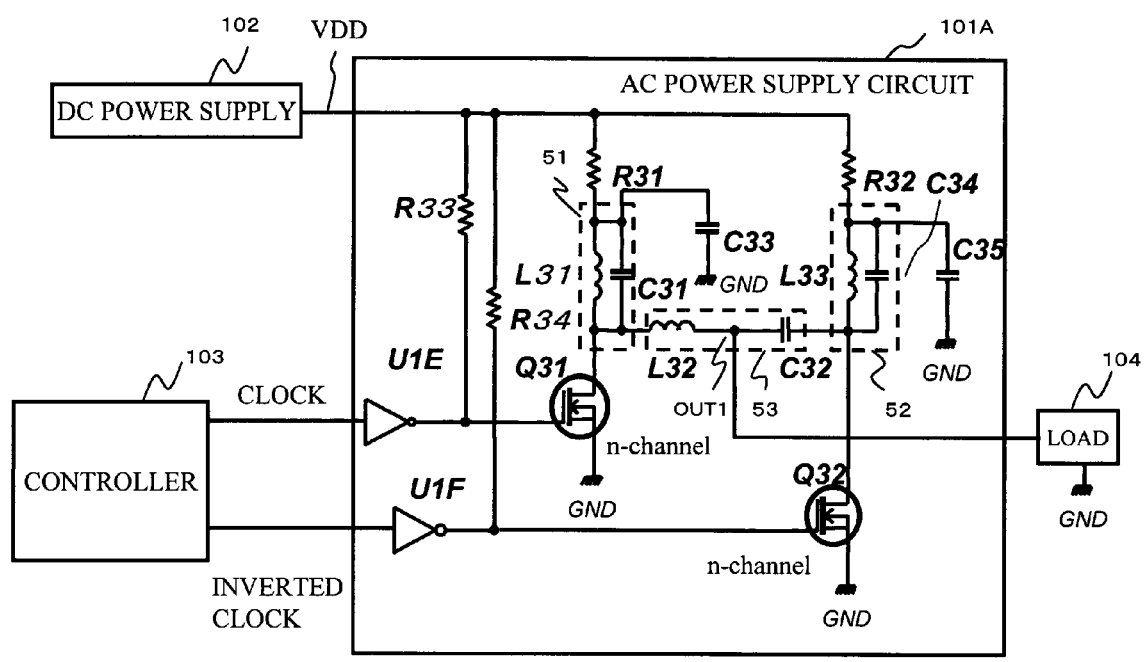
FIG. 2 is a circuit diagram of the power supply apparatus shown in FIG. 1.

The ac power supply circuit 101 will be described with reference to FIG. 2 in which a reference numeral 101A is assigned the ac power supply circuit 101 shown in FIG. 1. The ac power supply circuit or apparatus 101A is characterized in that a voltage is alternately applied to both sides of a series resonance circuit by first and second resonance circuit parts. The series resonance circuit is made up of an inductor (inductance element) L32, a capacitor (capacitance element) C32 and the capacitive component of the load 104 connected to an output terminal OUT1 of the ac power supply circuit 101A. This configuration makes it possible to generate a larger output voltage than that of a comparative arrangement in which the voltage is applied to only one side of the series resonance circuit.

The dc power supply 102 generates a voltage VDD, which may be as low as 24 V. The clock signal having the logic level is applied to the switching elements of the ac power supply circuit 101A by the controller 103. The clock signal may have a duty ratio of 50% and a frequency of about 2 MHz. The clock signal may be generated by dividing the frequency of a pulse generated by a voltage-controlled oscillator (VCO) into two by a flip-flop. The pulse signal may have a voltage of 5 V. An inverted clock signal generated by the controller 103 has the same frequency as the clock signal and the phase opposite thereto. The load 4 may be, for example, a developing unit.

The ac power supply circuit 101A has two transistors Q31 and Q32, which correspond to the aforementioned two switching elements. The transistors Q31 and Q32 may be n-channel field-effect transistors. Although the present embodiment employs the n-channel field effect transistors, the switching elements may be formed by p-channel field effect transistors or bipolar transistors.

The source terminals of the n-channel field effect transistors Q31 and Q32 are grounded. The gate terminal of the transistor Q31 is supplied with the clock signal from the controller 103 via an open-collector inverter U1E, which inverts the received clock signal. The gate terminal of the transistor Q32 is supplied with the inverted clock signal from the controller 103 via an open-collector inverter U1F, which inverts the received inverted clock signal. The drain terminal of the transistor Q31 is connected to the dc power supply 102 via a current limiting resistor R31, and a parallel circuit of an inductor L31 and a capacitor C31.

The inductor L31 and the capacitor C31 form a first parallel resonance circuit 51. The inductor L31, the capacitor C31 and the n-channel field effect transistor Q31 form a first resonance circuit part. The first resonance circuit part resonates at the same frequency as that of the clock signal from the controller 103 due to the inductance of the inductor L31 and the composite capacitance of the capacitor C31 and the output capacitance of the transistor Q31. The "same" frequency mentioned above does not mean strictly the same but allows to fall in a certain tolerable range. The first resonance circuit part may not use the capacitor C31 but may be composed of the inductor L31 and the transistor Q31.

The first parallel resonance circuit part maximizes the impedance of the power supply viewed from the transistor Q31, and thus maximizes the switching efficiency. The current limiting resistor R31 is interposed between the drain terminal of the transistor Q31 and the dc power supply 102 in series. The resistor R31 limits the current flowing therethrough and prevents the transistor Q31 from being burned out due to excessive current.

The drain terminal of the n-channel field effect transistor Q32 is connected to the dc power supply 102 via a parallel circuit of a current limiting resistor R32, and an inductor L33 and a capacitor C34.

The inductor L33 and the capacitor C34 form a second parallel resonance circuit 52. The inductor L33, the capacitor C34 and the n-channel field effect transistor Q32 form a second resonance circuit part. The second resonance circuit part resonates at the same frequency as that of the clock signal from the controller 103 due to the inductance of the inductor L33 and the composite capacitance of the capacitor C34 and the output capacitance of the transistor Q32. The "same" frequency mentioned above does not mean strictly the same but allows to fall in a certain tolerable range. The second resonance circuit part may not use the capacitor C34 but may be composed of the inductor L33 and the transistor Q32.

The second parallel resonance circuit part maximizes the impedance of the power supply viewed from the transistor Q32, and thus maximizes the switching efficiency. The current limiting resistor R32 is interposed between the drain terminal of the transistor Q32 and the dc power supply 102 in series. The resistor R32 limits the current flowing therethrough and prevents the transistor Q32 from being burned out due to excessive current. A voltage compensation capacitor C33 is connected between the drain-side end of the resistor R31 and ground. Similarly, a voltage compensation capacitor C35 is connected between the drain-side end of the resistor R32 and ground. The voltage compensation capacitors C33 and C35 compensate for an abrupt voltage change.

A series circuit of the inductor L32 and the capacitor C32 is interposed between the drains of the transistors Q31 and Q32. The connection node of the inductor L32 and the capacitor C32 serves as the output terminal OUT1 via which the output is supplied to the load 104. In the arrangement shown in FIG. 2, the inductor L32 is connected to the drain of the transistor Q31, and the capacitor is connected to the drain of the transistor Q32. Alternatively, the reverse connection may be made.

The inductor L32 and the capacitor C32 form a series resonance circuit 53. The inductor L32, the capacitor C32 and the n-channel field effect transistor Q32 form a series resonance circuit part.

The above series resonance circuit part resonates at the same frequency as that of the clock signal from the controller 103. Preferably, the values of the inductor L32 and the capacitor C32 may be selected so that the inductor L32 has a comparatively large value in order to have a Q value as high as possible.

The operation of the ac power supply circuit 101A shown in FIG. 2 will now be described with reference to FIG. 3, which is a timing chart of the operation of the ac power supply circuit 101A.

Figure 3:
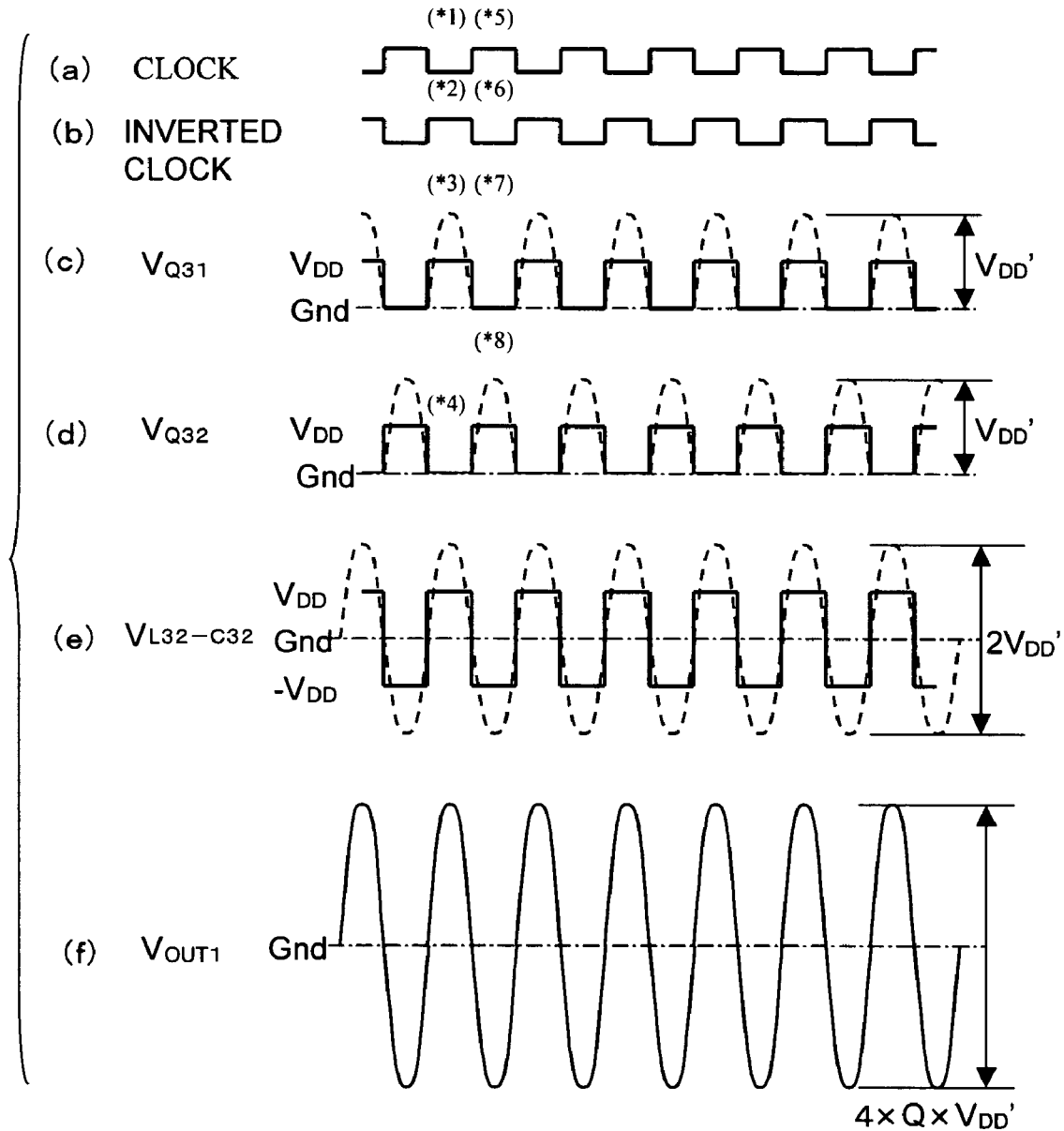
FIG. 3 is a timing chart of an operation of the power supply circuit shown in FIG. 2.

Referring to FIG. 3, part (a) shows the clock signal (Clock) supplied to the ac power supply circuit 101A from the controller 103, and part (b) shows the inverted clock signal (Inv. Clock) that has the same frequency as that of the clock signal and the phase opposite thereto. Part (c) of FIG. 3 shows the drain voltage VQ31 of the n-channel field effect transistor Q31, and part (d) shows the drain voltage VQ32 of the n-channel field effect transistor Q32. Part (e) shows the voltage $V_{L32-C32}$ developing across the series resonance circuit of the inductor L32 and the capacitor C32.

The clock signal shown in part (a) of FIG. 3 is applied to the gate of the transistor Q31, and the inverted clock signal is applied to the gate of the transistor Q32. Thus, the transistors Q31 and Q32 alternately turn on and off. More particularly, when the clock signal from the controller 103 is at the high level (*1) and the inverted clock signal is at the low level (*2), the transistors Q31 and Q32 are respectively off and on.

Thus, the current that flows from the dc power supply 102 to the ground through the current limiting resistor R31, the inductor L31 and the transistor Q31 is cut off. In turn, the current flows from the dc power supply 102 to the ground through the current limiting resistor R32, the inductor L33 and the transistor Q32. Thus, the drain voltage VQ31 of the transistor Q31 resonates about the 24V dc voltage due to the function of the parallel resonance circuit part, so that a drain voltage VDD' of the drain terminal of the transistor Q31 as shown by the broken line (*3) in part (c) of FIG. 3 can be produced.

The drain voltage VQ32 of the transistor Q32 is 0 V (*4) as shown in part (d) of FIG. 3. The drain voltage VDD' of the transistor Q31 is approximately twice the dc voltage VDD although it depends on the Q value.

When the clock signal changes to the low level (*5) and the inverted clock signal changes to the high level (*6), the transistors Q31 and Q32 are turned on and off, respectively. This allows the current to flow from the dc power supply 102 to the ground through the current limiting resistor R31, the inductor L31 and the transistor Q31. The drain voltage VQ31 of the transistor Q31 changes to 0 V (*7), while the drain voltage VQ32 changes to VDD' (*8) due to the function of the parallel resonance as in the case of the transistor Q31.

The above-mentioned operation is repeatedly carried out in synchronism with the clock signal and the inverted clock signal that are externally supplied. Thus, as shown in parts (c) and (d) of FIG. 3, the drain voltages VQ31 and VQ32 resonant between 0 V and VDD'. The voltage $V_{L32-C32}$ applied across the series resonance circuit part (it is assumed that the direction from the inductor L32 to the capacitor C32 is positive) is the difference between the waveform shown by the broken line in part (c) of FIG. 3 and the waveform shown by the broken line in part (d), and is therefore equal to 2VDD', as shown in part (e). Thus, the voltage approximately equal to four times the 24V dc power supply voltage can be applied across the series resonance circuit part.

Furthermore, the use of the series resonance circuit part makes it possible to generate the amplitude Q times as large as VDD' at the output terminal OUT1. The waveform of the boosted amplitude is shown in part (f) of FIG. 3. The ac power supply circuit 101A can generate a waveform having a peak-to-peak of 4×Q×VDD' at the output terminal OUT1. The ac power supply circuit 101A can be used alone for an application of an ac power supply.

Second Embodiment

Figure 4:
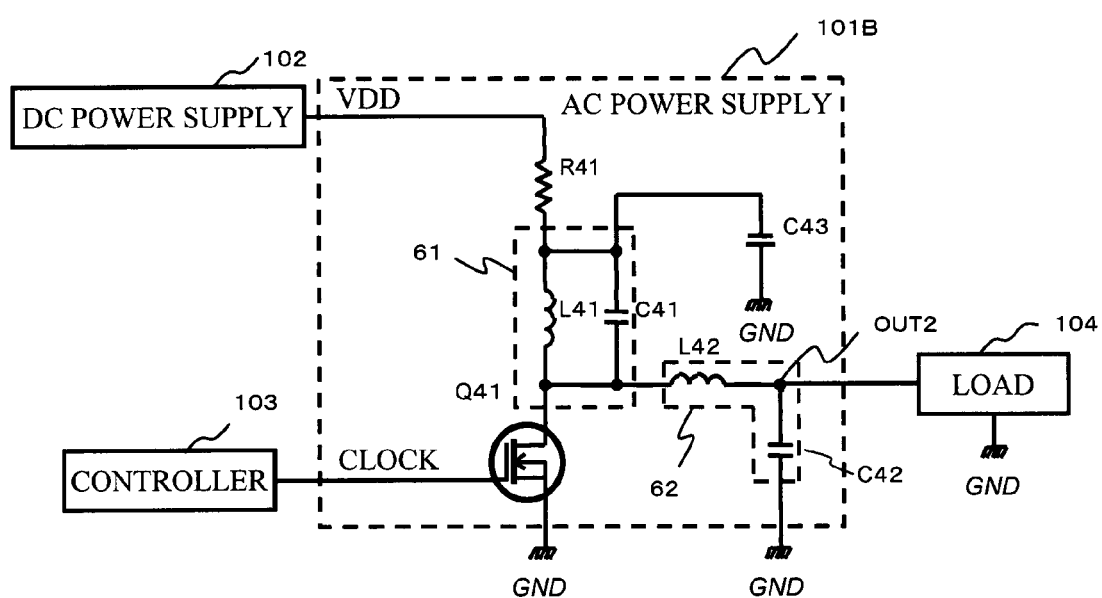
FIG. 4 is a circuit diagram of a power supply apparatus according to a second embodiment of the present invention.

A description will now be given of a second embodiment of the present invention. FIG. 4 is a circuit diagram of an ac power supply circuit or apparatus 101B according to the second embodiment of the present invention. The ac power supply circuit 101B is designed to drive only one of the two ends of the series resonance circuit part made up of the inductor L42, the capacitor C42 and the capacitive component of the load 104 connected to an output terminal OUT2 to thus generate an ac output. This arrangement differs from that of the first embodiment of the invention in which both the ends of the series resonance circuit part are driven.

The ac power supply circuit 101B collaborates with the dc power supply 102 that generates the voltage as low as 24 V. The clock signal generated by the controller 103 is applied to a transistor Q41 of the ac power supply circuit 101B. The transistor Q41 serves as a switching element. The clock signal may be generated by dividing the frequency of a pulse generated by a voltage-controlled oscillator (VCO) into two by a flip-flop. The pulse signal may have a voltage of 5 V.

The transistor Q41 is an n-channel field effect transistor. The source terminal of the transistor Q41 is grounded. The gate of the transistor Q41 is supplied with the clock signal. The drain of the transistor Q41 is connected to the dc power supply 102 via a parallel circuit of an inductor L41 and a capacitor C41 and a resistor R41.

The parallel circuit of the inductor L41 and the capacitor C41 form a resonance circuit 61. The inductor L41 also forms a parallel resonance circuit part together with a composite capacitance of the capacitor C41 and the output capacitance of the transistor Q41. The parallel resonance circuit part resonates at the same frequency as that of the clock signal. The "same" frequency mentioned above does not mean strictly the same but may fall in a certain tolerable range. The parallel resonance circuit part does not include the capacitor c41, but may be composed of the inductor L41 and the transistor Q41 only.

The parallel resonance circuit part maximizes the impedance of the power supply viewed from the transistor Q41, and thus maximizes the switching efficiency. The current limiting resistor R41 is interposed between the drain terminal of the transistor Q41 and the dc power supply 102 in series. The resistor R41 limits the current flowing therethrough and prevents the transistor Q41 from being burned out due to excessive current. A capacitor C43 is connected between the end of the resistor R41 on the drain side of the transistor Q41 and ground. The capacitor C43 compensates for an abrupt voltage change. The drain of the transistor Q41 is connected to a series circuit of the inductor L42 and the capacitor C42. The connection node of the inductor L42 and the capacitor C42 serves as the output terminal OUT2 via which the output voltage is applied to the load 104.

The series circuit of the inductor L42 and the capacitor C42 is a series resonance circuit 62. The inductor L42 and the composite capacitance of the capacitor C42 and the capacitance of the load 104 connected to the output terminal OUT2 form a series resonance circuit part, which resonates at the same frequency as that of the clock signal. The values of the inductor L42 and the capacitor C42 may be selected so that the inductor L42 has a comparatively large value in order to have a Q value as high as possible.

Figure 5:
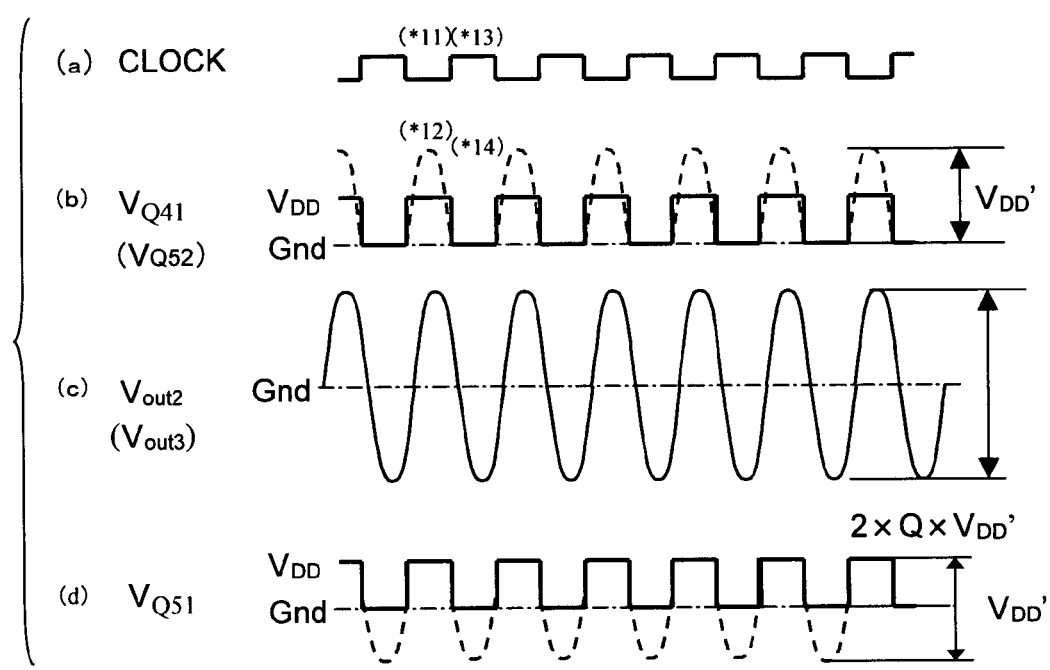
FIG. 5 is a timing chart of an operation of the power supply apparatus shown in FIG. 4.

The operation of the ac power supply circuit 101B shown in FIG. 4 will now be given with reference to parts (a) through (c) of FIG. 5, which show the operation of the ac power supply circuit 101B. Part (d) of FIG. 5 will be described later in connection with a third embodiment of the present invention. The clock signal shown in part (a) of FIG. 5 is the logic-level clock signal applied to the ac power supply circuit 101B. A voltage VQ41 is available at the drain terminal of the n-channel field effect transistor Q41. A voltage Vout2 is available at the output terminal OUT2. The transistor Q41 is turned on and off in response to the clock signal shown in part (a) of FIG. 5. More particularly, when the clock signal is at the low level (*11), the transistor Q41 is off.

Thus, the current that flows from the dc power supply 102 to the ground through the current limiting resistor R41, the inductor L41 and the transistor Q41 is cut off. Thus, the drain voltage VQ41 of the transistor Q41 resonates about the 24V dc voltage due to the function of the parallel resonance circuit part, so that a drain voltage VDD' as shown by the broken line (*12) in part (b) of FIG. 5 can be produced. The drain voltage VDD' is approximately twice the voltage VDD although it depends on the Q value.

When the clock signal shown in part (a) of FIG. 5 switches to the high level (*13), the transistor Q41 is turned on. This enables current to flow from the dc power supply 102 to the ground through the current limiting resistor R41, the inductor L41, and the transistor Q41. Thus, the voltage VQ41 at the drain terminal of the transistor Q41 is 0 V (*14) as shown in part (b) of FIG. 5.

The above-mentioned operation is repeatedly carried out in accordance with the clock signal from the controller 103, so that the voltage VQ41 resonates between 0 V and VDD'. The voltage $V_{L42-C42}$ applied across the series resonance circuit part is the maximum value of the waveform indicated by the broken line in part (b) of FIG. 5 and is equal to VDD'. It is therefore possible to apply a voltage (2×VDD) approximately equal to twice the dc voltage of 24 V across the series resonance circuit part.

Furthermore, the use of the series resonance circuit part makes it possible to generate the amplitude Q times as large as VDD' at the output terminal OUT2. The waveform of the boosted amplitude is shown in part (c) of FIG. 5. The ac power supply circuit 101B can generate a waveform having a peak-to-peak of 2×Q×VDD' at the output terminal OUT2. The ac power supply circuit 101B can be used alone for an application of an ac power supply.

Third Embodiment

An ac power supply circuit according to a third embodiment of the present invention will now be described with reference to FIG. 6, which shows a configuration of the circuit. An ac power supply circuit 101C or apparatus shown in FIG. 6 drives only one of the two ends of a series resonance circuit composed of an inductor L52, a capacitor C52 and the capacitive component of the load 104 connected to an output terminal OUT3. This differs from the first embodiment of the invention in which both the ends of the series resonance circuit part are driven.

The ac power supply circuit 101C collaborates with the dc power supply 102 that generates the voltage as low as 24 V. The clock signal generated by the controller 103 is applied to a transistor Q51 of the ac power supply circuit 101C. The transistor Q51 serves as a switching element. The clock signal may be generated by dividing the frequency of a pulse generated by a voltage-controlled oscillator (VCO) into two by a flip-flop. The pulse signal may have a voltage of 5 V.

Figure 6:
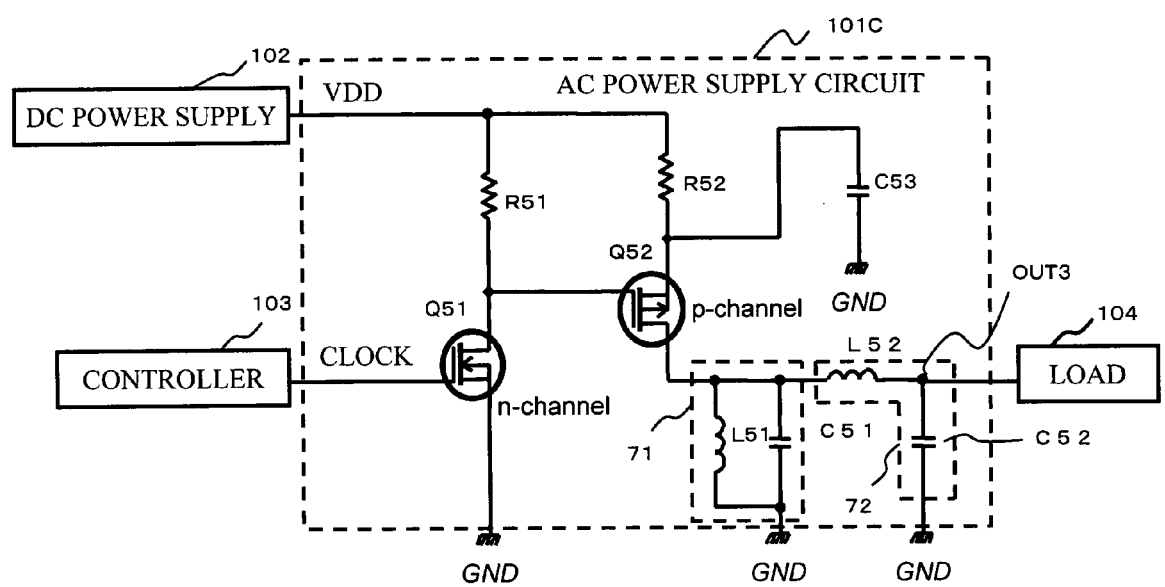
FIG. 6 is a circuit diagram of a power supply apparatus according to a third embodiment of the present invention.

As shown in FIG. 6, the ac power supply circuit 101C is configured as follows. The circuit 101C has an n-channel field effect transistor Q51 and a p-channel field effect transistor Q52. A current limiting resistor R51 is connected between the dc power supply 102 and the drain of the transistor Q51. A current limiting resistor R52 is connected between the dc power supply 102 and the source of the transistor Q52. A capacitor C53 is connected between the source of the transistor Q52 and ground. An inductor L51 is connected between the drain of the transistor Q52 and ground. Similarly, a capacitor C51 is connected between the drain of the transistor Q52 and ground. An inductor L52 is connected between the drain of the transistor Q52 and the load 104. A capacitor C52 is connected between the connecting node of the inductor L52 and the load 104 and ground. The gate terminal of the transistor Q51 is supplied with the clock signal supplied from the controller 103. The connecting node of the inductor L52 and the capacitor C52 serves as an output terminal OUT3. The transistor Q51 is provided in order to invert the clock signal and thus realize the same operation as that of the second embodiment. Therefore, the transistor Q51 may be omitted if the clock signal is arranged so as to match the p-channel transistor Q52.

The current limiting resistors R51 and R52 limit the associated currents in order to prevent the transistors Q51 and Q52 from being burned out due to excessive current. The capacitor C53 connected to the source of the transistor Q52 compensates for an abrupt voltage change.

The inductor L51 and the capacitor C51 form a parallel resonance circuit 71. A parallel resonance circuit part composed of the inductor L51 and the composite capacitance of the capacitor C51 and the output capacitance of the transistor Q52 resonates at the same frequency as that of the clock signal. The "same" frequency mentioned above does not mean strictly the same but may fall in a certain tolerable range. The parallel resonance circuit part may be formed without the capacitor C51. In this case, the parallel resonance circuit part may be composed of the inductor L51 and the output capacitance of the transistor Q52. The parallel resonance circuit part maximizes the impedance of the power supply viewed from the transistor Q52 serving as the switching element, and enhances the switching efficiency.

The inductor L52 and the capacitor C52 form a series resonance circuit 72. A series resonance circuit part is formed by the inductor L52 and the composite capacitance of the capacitor C52 and the capacitive component of the load 104. This series resonance circuit part resonates at the same frequency as that of the clock signal. The values of the inductor L32 and the capacitor C32 may be selected so that the inductor L32 has a comparatively large value in order to have a Q value as high as possible.

The operation of the ac power supply circuit shown in FIG. 6 will now be described with reference to FIG. 5 that has been mentioned previously.

The clock signal supplied from the controller 103 is applied to the gate of the transistor Q51 of the ac power supply circuit 101C. Part (b) of FIG. 5 shows the voltage of the drain terminal of the transistor Q52. Part (c) of FIG. 5 shows the output voltage Vout3 available at the output terminal OUT3.

The transistor Q51 is turned on and off in response to the clock signal. When the clock signal is at the low level, the transistor Q51 is off. This turns off the transistor Q52. Therefore, the current that passes from the dc power supply 102 to the ground through the current limiting resistor R52 and the transistor Q52 and the inductor L51 is cut off. This causes the voltage VQ52 of the drain terminal of the transistor Q52 to resonate about the ground level (0 V) due to the function of the parallel resonance circuit part. Thus, the voltage VQ2 has a wave height of VDD' as shown in part (b) of FIG. 5. The drain voltage VDD' of the transistor Q52 is approximately twice the dc voltage VDD although it depends on the Q value.

When the clock signal switches to the high level, the transistor Q51 is turned on and the transistor Q52 is thus turned on. This allows the current to flow from the dc power supply 102 to the ground via the current limiting resistor 52, the transistor Q52 and the inductor L51.

The above-mentioned operation is repeatedly carried out in accordance with the clock signal from the controller 103. Thus, as is shown in part (d) of FIG. 5, a wave that has a waveform height of VDD' and swings between VDD and a level approximately equal to −VDD can be produced. The voltage $V_{L52-C52}$ applied across the series resonance circuit part is defined by the maximum value of the waveform indicated by the broken line, so that a voltage (2×VDD) approximately twice the 24V dc voltage can be applied across the series resonance circuit part. Furthermore, the use of the series resonance circuit part makes it possible to generate the amplitude Q times as large as VDD' at the output terminal OUT3. Thus, the ac power supply circuit 101C can generate a waveform having a peak-to-peak of 2×Q×VDD' at the output terminal OUT3. The ac power supply circuit 101C can be used alone for an application of an ac power supply.

The 5V clock signal applied to the transistor Q51 is inverted and boosted to a voltage of about 24 V in the case where the dc power supply 102 generates the 24V dc voltage. The parallel resonance circuit composed of the transistor Q52, the inductor L51 and the capacitor C51 produces, from the output voltage of the transistor Q51, the voltage that swings between +24 V and −24 V about the ground level (0 V). Further, the ±24V signal is boosted by Q times due to the function of the series resonance circuit, so that a voltage having an amplitude as large as ±200 V can be produced and applied to the load 104.

Fourth Embodiment

A description will now be given of a fourth embodiment of the present invention with reference to FIG. 7. An ac power supply circuit shown in FIG. 7 employs the aforementioned ac power supply circuits 101A and 101B, which are respectively associated with controllers 103A and 103B.

Figure 7:
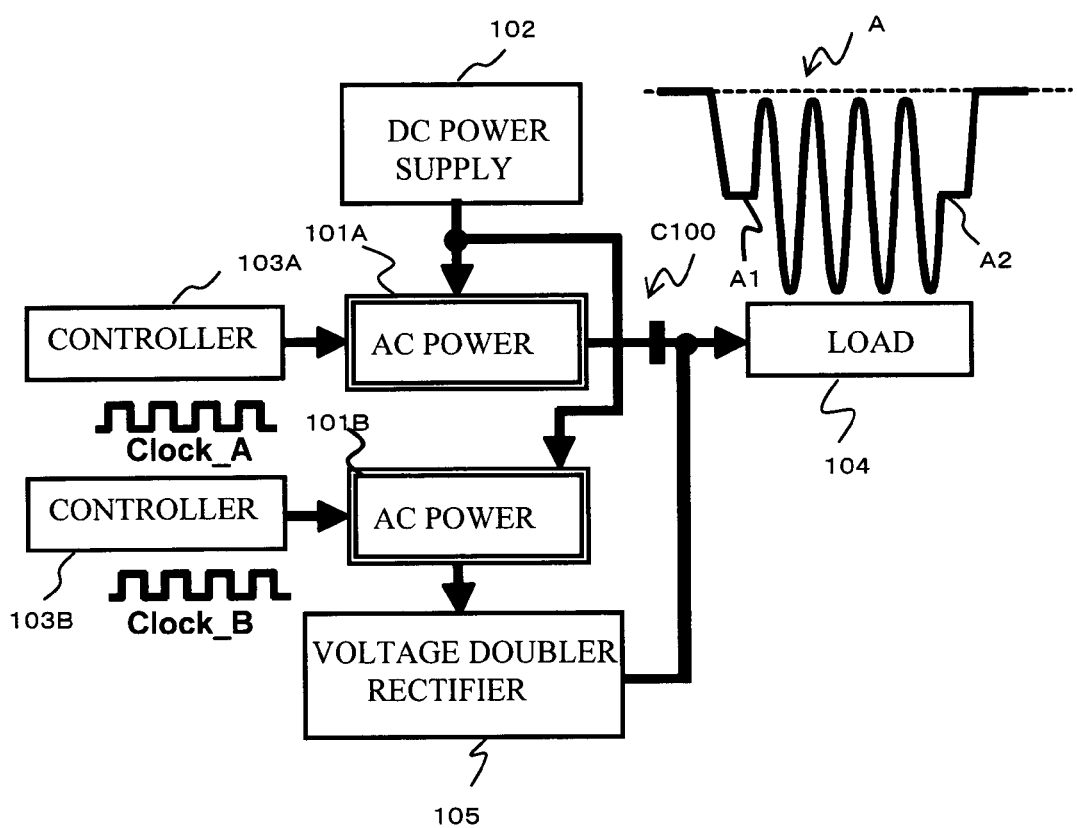
FIG. 7 is a block diagram of a power supply apparatus according to a fourth embodiment of the present invention.

Further, the ac power supply circuit shown in FIG. 7 has a voltage doubler rectifier circuit 105, and a capacitor C100.

The ac power supply circuit 101A is connected to the dc power supply 102 and applies the sine wave having a large amplitude to the load 104 via the capacitor C100 in accordance with a clock signal A supplied from the controller 103A. The capacitor C100 functions to superimpose the ac voltage from the ac power supply circuit 101A on the dc voltage from the voltage doubler rectifier circuit 105 that collaborates with the ac power supply circuit 101B. The ac power supply circuit 101B is connected to the dc power supply 102, and supplies the sine wave having a large amplitude to the voltage doubler rectifier circuit 105 in accordance with a clock signal B supplied from the controller 103B.

The voltage doubler rectifier circuit 105 doubles the output voltage from the ac power supply circuit 101B, and produces the rectified voltage, which is then applied to the load 104. The load is, for example, the developing unit. A symbol "A" shown in FIG. 7 is the voltage applied to the load 104. Symbols "A1" and "A2" indicate a dc level defined by the dc voltage produced by the voltage doubler rectifier circuit 105. The ac power supply circuit 101A may be any of the aforementioned first through third embodiments of the present invention, and the ac power supply circuit 101B may be any of the aforementioned first through third embodiments of the present invention. The voltage doubler rectifier circuit 105 may have multiple stages, which make it possible to produce a dc voltage multiple times as large as that of the single-stage configuration.

Fifth Embodiment

Figure 8:
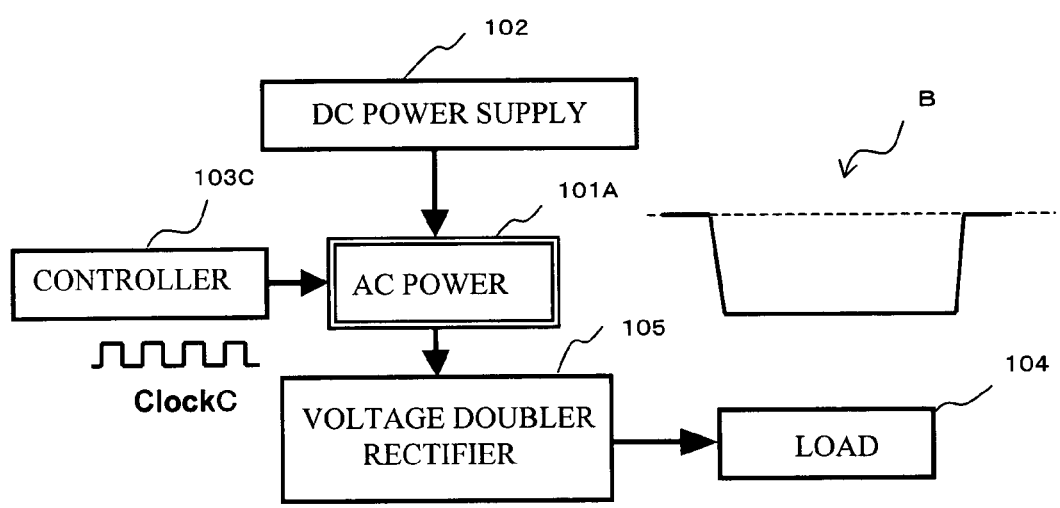
FIG. 8 is a block diagram of a power supply apparatus according to a fifth embodiment of the present invention.
Figure 9:
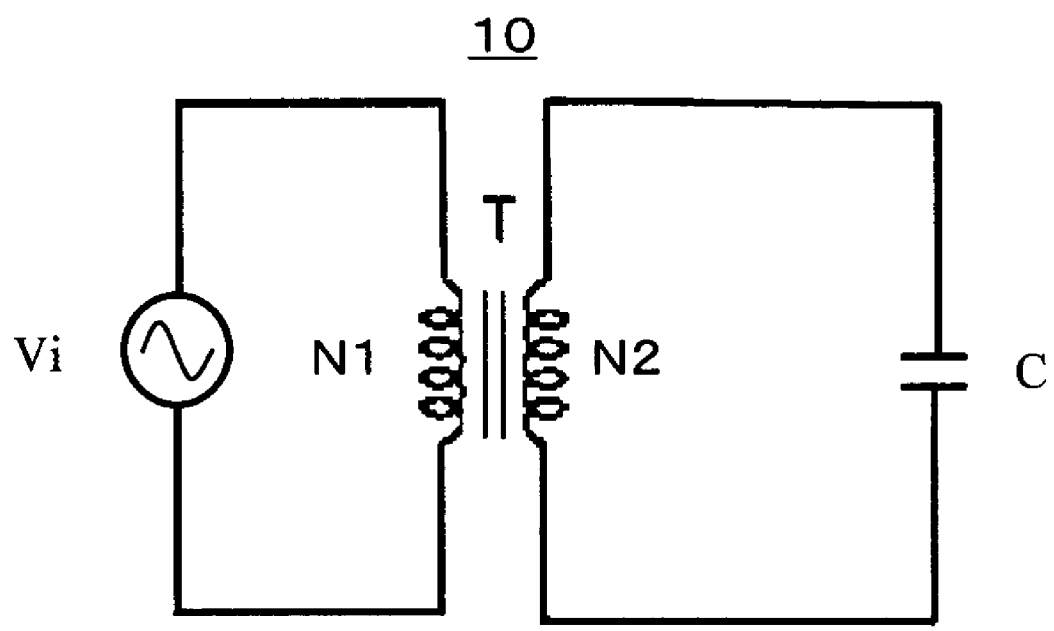
FIG. 9 is a circuit diagram of a conventional power supply apparatus.
Figure 10:
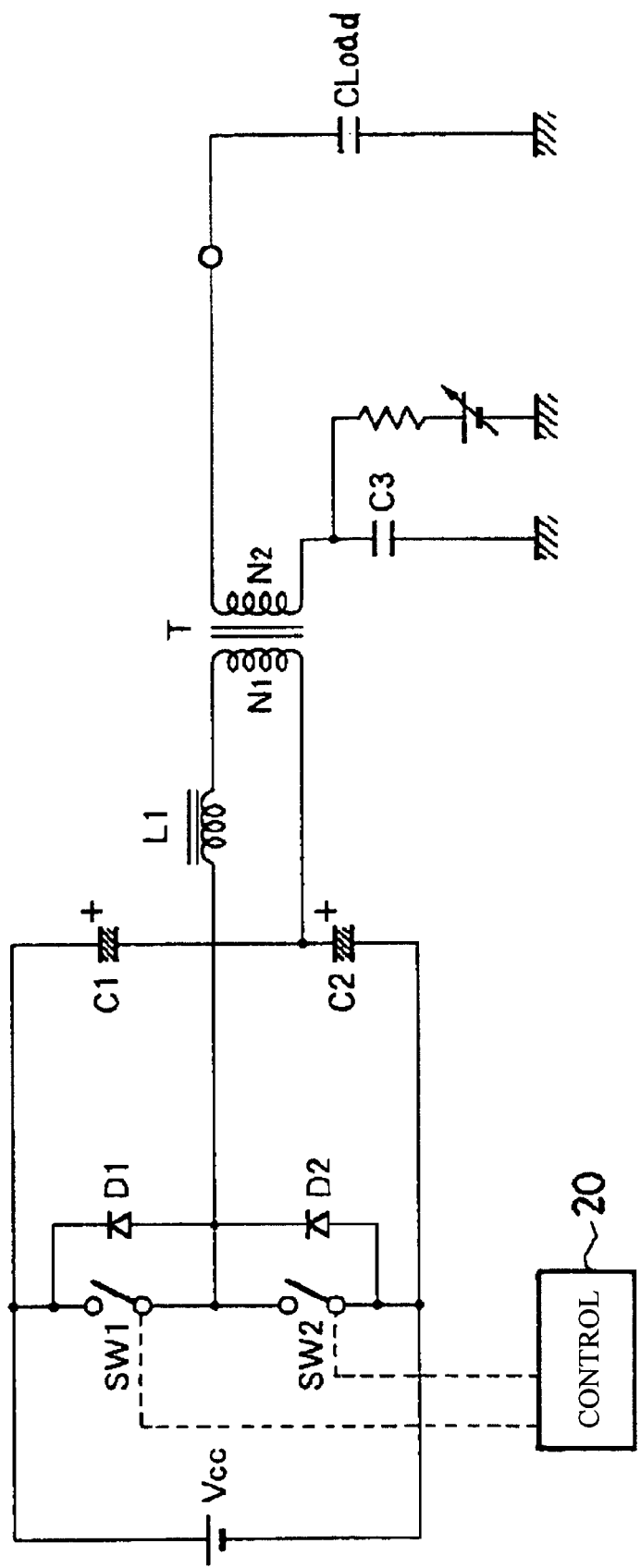
FIG. 10 is a circuit diagram of another conventional power supply apparatus.
Figure 11:
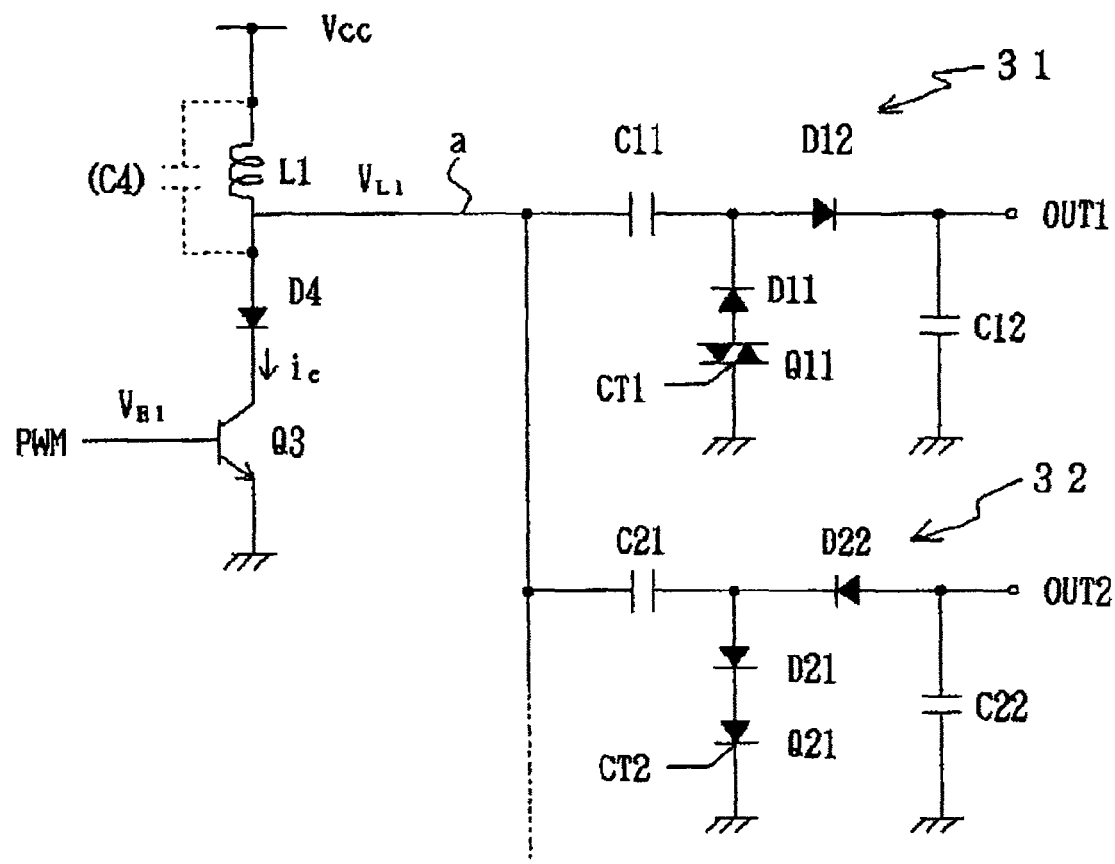
FIG. 11 is a circuit diagram of yet another conventional power supply apparatus.

FIG. 8 is a block diagram of a power supply circuit according to a fifth embodiment of the present invention, in which the ac power supply circuit 101A employed in the first embodiment is used. The ac power supply circuit 101A receives a clock signal C from a controller 103C. The ac power supply circuit 101A generates the sine wave having a large amplitude in accordance with the clock signal C from the controller 103C, and supplies it to the voltage doubler rectifier circuit 105.

The voltage doubler rectifier circuit 105 doubles the voltage from the ac power supply circuit 101A and produces the rectified voltage, which is applied to the load 104. The load 104 is, for example, the developing unit. A symbol "B" denotes the dc voltage applied to the load 104. The ac power supply circuit 101A may be one of the aforementioned second or third embodiments of the present invention. The voltage doubler rectifier circuit 105 may have multiple stages, which make it possible to produce a dc voltage multiple times that of the single-stage configuration.

The above-mentioned power supply circuit or apparatus can be suitably used to supply high voltages to components of the image forming apparatus, such as those for a developing unit for developing a toner image on a photoconductor member and for a charger for charging the photoconductor member, and a bias voltage for a cleaner. The fourth and fifth embodiments of the present invention that collaborate with the voltage doubler rectifier circuit can be used as dc power supplies. The ac power supply circuits according to the first through third embodiments of the present invention may be combined with a dc power supply, so that the combined power supply can be used as an ac source for the developing unit.

The present invention includes an image forming apparatus that includes an image forming part and a power supply apparatus that supplies power to the image forming part.

Figure 12:
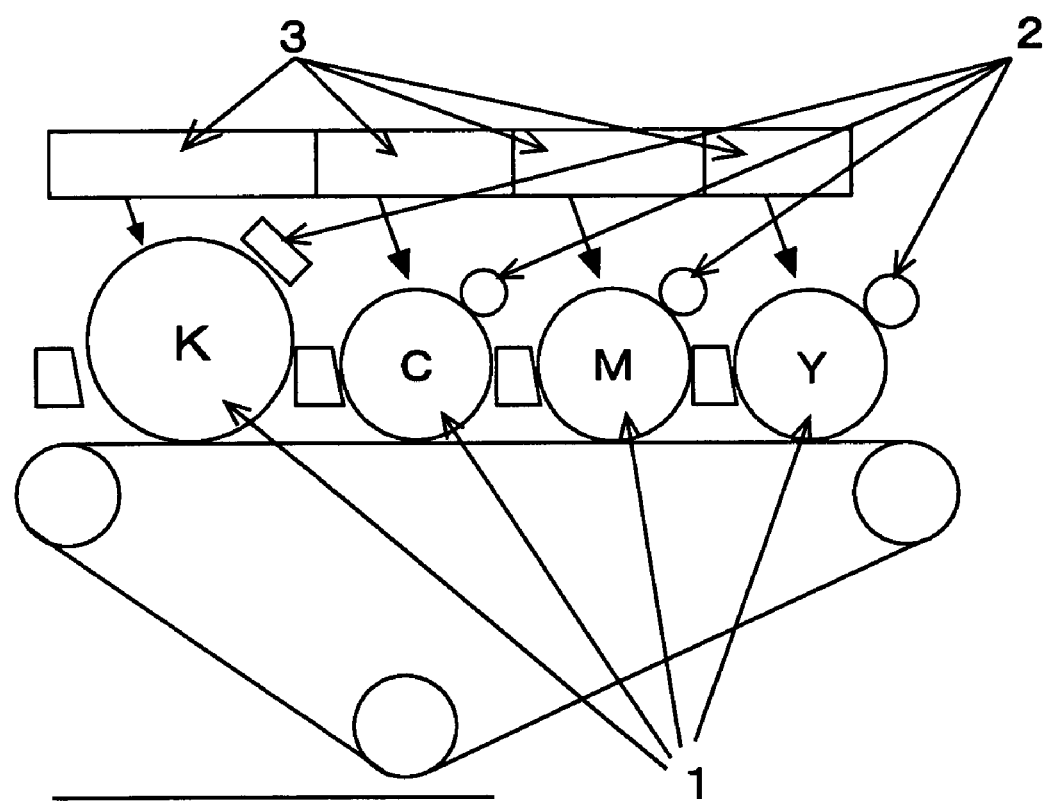
FIG. 12 is a diagram of an image forming device according to an embodiment of the present invention.

FIG. 12 shows an image forming apparatus to which the power supply apparatus is applied according to the present invention. The image forming apparatus has an image forming part, which includes, for each of four colors YMCK, a photoconductor drum 1, a charger device 2 and an electrostatic latent image recording device 3. The charger devices charges up the associated photoconductor drum 1. The latent image recording device 3 records an electrostatic latent image on the photoconductor drum 1 that has been electrically charged. The power supply apparatus supplies power to, for example, the electrostatic latent image recording device 3.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A power supply apparatus comprising:
   first and second parallel resonance circuits, each having first and second terminals;
   a first switching element that is connected to the second terminal of the first parallel resonance circuit and forms a first parallel resonance circuit part together with the first parallel resonance circuit;
   a second switch element that is connected to the second terminal of the second parallel resonance circuit and forms a second parallel resonance circuit part together with the second parallel resonance circuit; and
   a series resonance circuit having a first end connected to the second terminal of the first parallel resonance circuit and a second end connected to the second terminal of the second parallel resonance circuit,
   the first terminals of the first and second parallel resonance circuits being coupled to a DC power supply provided in common thereto,
   the first and second switching elements being alternately turned on and off in accordance with control signals externally supplied.

2. The power supply apparatus as claimed in claim 1, wherein one of the first and second parallel resonance circuit parts comprises a composite capacitance formed by a first capacitive element and an output capacitance of one of the first and second switching elements.

3. The power supply apparatus as claimed in claim 1, wherein the series resonance circuit comprises a composite capacitance formed by a second capacitive element and a capacitance of a load supplied with power supplied by the power supply apparatus.

4. The power supply apparatus as claimed in claim 2, wherein the series resonance circuit comprises a composite capacitance formed by a second capacitive element and a capacitance of a load supplied with power supplied by the power supply apparatus.

5. The power supply apparatus as claimed in claim 1, wherein the control signal applied to the second switching element has a phase opposite to that of the control signal applied to the first switching element.

6. The power supply apparatus as claimed in claim 1, wherein the first and second switching elements are transistors, and resistors are provided between the transistors and a DC power supply.

7. The power supply apparatus as claimed in claim 1, wherein:

the first and second switching elements are transistors, and resistors for use in current limiting are provided between the transistors and a DC power supply; and connection nodes between the transistors and the resistors are grounded via capacitors.

8. The power supply apparatus as claimed in claim 1, wherein the series resonance circuit comprises an inductance element and a capacitance element connected in series, and a connection node therebetween is an output terminal of the power supply apparatus.

9. The power supply apparatus as claimed in claim 1, further comprising a voltage doubler rectifier circuit connected to a node in the series resonance circuit.

10. A power supply circuit comprising:
first and second switching elements respectively controlled by first and second clock signals;
a first parallel resonance circuit having first and second terminals, the first switching element connected to the second terminal of the first parallel resonance circuit and a DC power supply connected to the first terminal of the first parallel resonance circuit;
a second parallel resonance circuit having first and second terminals, the second switching element connected to the second terminal of the second parallel resonance circuit and the DC power supply connected to the first terminal of the second parallel resonance circuit, the DC power supply provided in common to the first and second parallel resonance circuits; and
a series resonance circuit having a first end connected to the second terminal of the first parallel resonance circuit and having a second end connected to the second terminal of the second parallel resonance circuit,
an output voltage of the power supply circuit being obtained from a node in the series resonance circuit.

11. The power supply circuit as claimed in claim 10, further comprising a first resistor interposed between the DC power supply and the first parallel resonance circuit, and a second resistor interposed between the DC power supply and the second parallel resonance circuit.

12. The power supply circuit as claimed in claim 11, further comprising a first capacitor via which a first node at which the first resistor and the first parallel resonance circuit are connected in series is grounded, and a second capacitor via which a second node at which the second resistor and the second parallel resonance circuit are connected in series is grounded.

13. The power supply circuit as claimed in claim 10, further comprising a voltage doubler rectifier circuit that produces, from the output voltage a DC voltage that has an amplitude multiple times as large as an amplitude of the DC power supply.

14. An image forming apparatus comprising:
an image forming part; and
a power supply apparatus that supplies power to the image forming part,
the power supply apparatus comprising:
first and second parallel resonance circuits, each having first and second terminals;
a first switching element that is connected to the second terminal of the first parallel resonance circuit and forms a first parallel resonance circuit part together with the first parallel resonance circuit;
a second switch element that is connected to the second terminal of the second parallel resonance circuit and forms a second parallel resonance circuit part together with the second parallel resonance circuit; and
a series resonance circuit having a first end connected to the second terminal of the first parallel resonance circuit and a second end connected to the second terminal of the second parallel resonance circuit,
the first terminals of the first and second parallel resonance circuits being coupled to a DC power supply provided in common thereto,
the first and second switching elements being alternately turned on and off in accordance with control signals externally supplied.

15. A power supply apparatus comprising:
first and second parallel resonance circuits;
a first switching element that is connected to the first parallel resonance circuit and forms a first parallel resonance circuit part together with the first parallel resonance circuit;
a second switch element that is connected to the second parallel resonance circuit and forms a second parallel resonance circuit part together with the second parallel resonance circuit; and
a series resonance circuit having a first end connected to an end of the first parallel resonance circuit part and a second end connected to an end of the second parallel resonance circuit part,
the first and second switching elements being alternatively turned on and off in accordance with control signals externally supplied in order to alternately connect the first and second ends to a reference potential defined in common to the first and second parallel resonance circuits.

* * * * *